(12) United States Patent
Takahashi et al.

(10) Patent No.: US 6,725,001 B2
(45) Date of Patent: Apr. 20, 2004

(54) OPERATION PANEL UTILIZED FOR IMAGE-FORMING APPARATUS AND IMAGE-FORMING APPARATUS

(75) Inventors: Atsushi Takahashi, Akishima (JP); Kazumichi Yamauchi, Tokyo (JP); Norio Joichi, Tokyo (JP); Yoshihito Sasamoto, Hachioji (JP); Akifumi Isobe, Hachioji (JP); Yoshiki Katayama, Hachioji (JP)

(73) Assignee: Konica Minolta Technosearch Co., Ltd., Tokyo (JP)

( * ) Notice: Subject to any disclaimer, the term of this patent is extended or adjusted under 35 U.S.C. 154(b) by 0 days.

(21) Appl. No.: 10/184,526

(22) Filed: Jun. 28, 2002

(65) Prior Publication Data

US 2003/0012579 A1 Jan. 16, 2003

(30) Foreign Application Priority Data

Jul. 10, 2001 (JP) ........................ 2001-209180

(51) Int. Cl.[7] .............................................. G03G 15/00
(52) U.S. Cl. ........................................ 399/81; 399/90
(58) Field of Search .............................. 345/34, 46, 81; 399/81, 90

(56) References Cited

U.S. PATENT DOCUMENTS 4,682,158 A * 7/1987 Ito et al. ..................... 340/679
6,058,276 A * 5/2000 Leveto ......................... 399/81
6,067,173 A   5/2000 Kuwahara et al. .......... 358/474

FOREIGN PATENT DOCUMENTS

| JP | 05054836 | 3/1993 |
| JP | 09244543 | 9/1997 |
| JP | 11249507 | 9/1999 |
| JP | 2000132010 | 5/2000 |
| JP | 2001042591 | 2/2001 |

* cited by examiner

Primary Examiner—Hoang Ngo
(74) Attorney, Agent, or Firm—Squire, Sanders & Dempsey, L.L.P.

(57) ABSTRACT

There is described an operation panel, which is detachably or movably mounted onto an image-forming apparatus, and which includes a data-inputting section to input operational data necessary for operating the image-forming apparatus and/or a displaying section to display status information of the image-forming apparatus. The operation panel comprises: a circuit board, on which electronic parts are mounted; a supporting member to support the circuit board, the data-inputting section and/or the displaying section, so as to integrate them into a single unit serving as the operation panel; a signal line, through which electronic signals are communicated between the operation panel and the image-forming section; and a conductive member for directly grounding at least one of the data-inputting section, the displaying section and the circuit board to a conductive main-frame of the image-forming apparatus. The signal line and the conductive member are disposed at separate positions being different relative to each other.

16 Claims, 4 Drawing Sheets

OPERATION PANEL UTILIZED FOR IMAGE-FORMING APPARATUS AND IMAGE-FORMING APPARATUS

BACKGROUND OF THE INVENTION

The present invention relates to image-forming apparatus such as copiers, printers, facsimile devices, etc., and specifically relates to improvement of an operation panel utilized for the image-forming apparatus.

Generally speaking, the image-forming apparatus is provided with an operation panel on which operating members such as various kinds of operating buttons for setting a number of copy sheets, density of the image, magnification of the image and other various kinds of conditions for forming the image, and a button for commanding the commencement of the image-forming operation, etc., are mounted. Further, the operation panel is also equipped with a display section for displaying statuses of the operating members and the image-forming apparatus and for displaying various kinds of warning messages.

A touch panel including the liquid-crystal display is usually employed for the display section, and the operator operates both the operating members, such as a start button, etc., equipped as hard keys, and the touch panel to operate the image-forming apparatus. However, the operation panel has been basically fixed onto the mainframe of the image-forming apparatus.

Conventionally, since the liquid-crystal display for general use has a considerable directivity depending on viewing angles, the visibility of the operation panel has been deteriorated due to variations of the installed places and/or the operating methods of the image-forming apparatus, resulting in a bad maneuverability of the image-forming apparatus.

Concretely speaking, in conventional image-forming apparatus, since the number of items to be displayed on the touch panel is not large so much and the operating environment of the image file is substantially kept constant, the visibility of the operation panel has not been such a serious problem. In recent development of the image-forming apparatus, however, since the screen layout of the touch panel has been getting complicated in conjunction with the digitized multi-functioning trend and the multi-compounding trend, in which a plurality of image-forming functions, such as a copying function, a printing function, a facsimile function, etc., are compounded, and the viewing angle of the touch panel has been getting wider than ever in conjunction with the trend of widening the variety of the operating environments of the image-forming apparatus due to the wide variety of the applications of image-forming apparatus, the visibility of the operation panel and the maneuverability of the image-forming apparatus have been increasingly getting worse.

SUMMARY OF THE INVENTION

To overcome the abovementioned drawbacks in conventional image-forming apparatus, which occurs in conjunction with the digitized multi-functioning trend, the multi-compounding trend and the versatility of operating environments as mentioned above, it is an object of the present invention to provide a user-friendly image-forming apparatus having an operation panel matching with the functions provided for the image-forming apparatus, and being easy to use.

Although it has been applied that the operation panel is attached to the image-forming apparatus so as to be movable relative to the main-body of it in order to attain the abovementioned object of the present invention, the grounding problems of the electronic pars, such as the liquid-crystal display, etc., have been arisen as another problem in such the case.

The electronic parts employed in the image-forming apparatus are grounded to the conductive mainframe of the image-forming apparatus. In the structure in which the movable operation panel is employed, however, it has been revealed that operation errors, caused by noises, are liable to occur in the movable operation panel, when the grounding wires, for grounding the electronic parts in the movable operation panel to the conductive mainframe of the image-forming apparatus, are bounded together with the signal wires, through which the electronic signals are communicated between the movable operation panel and the image-forming apparatus.

Accordingly, another object of the present invention is to solve the abovementioned grounding problem arising in conjunction with the employment of the movable operation panel.

Accordingly, to overcome the cited shortcomings, the abovementioned objects of the present invention can be attained by operation panels and image-forming apparatus described as follow.

(1) An operation panel, which is detachably or movably mounted onto an image-forming apparatus, and which includes a data-inputting section to input operational data necessary for operating the image-forming apparatus and/or a displaying section to display status information of the image-forming apparatus, the operation panel comprising: a circuit board, on which electronic parts, constituting electronic circuits for driving the data-inputting section and/or the displaying section, are mounted; a supporting member to support the circuit board, the data-inputting section and/or the displaying section, so as to integrate them into a single unit serving as the operation panel; a signal line, connected to a connecting port of an image-forming section incorporated in the image-forming apparatus, through which electronic signals are communicated between the operation panel and the image-forming section; and a conductive member for directly grounding at least one of the data-inputting section, the displaying section and the circuit board to a conductive main-frame of the image-forming apparatus, which is maintained at a ground-potential of the image-forming apparatus; wherein the signal line and the conductive member are disposed at separate positions being different relative to each other.

(2) The operation panel of item 1, wherein the supporting member comprises an opening section through which the conductive member is led out of the operation panel.

(3) The operation panel of item 1, wherein the data-inputting section includes at least one of a touch panel, a hard-keys board and a ten-keys board, and/or the displaying section includes at least one of a liquid-crystal display unit, a fluorescent display-tube and a light emitting diode.

(4) The operation panel of item 1, further comprising: a shielding member to electrically shield either a part of or all of the operation panel; wherein the conductive member is electrically coupled to the shielding member.

(5) The operation panel of item 1, wherein the signal line is a bundle of a plurality of signal wires, each of which is coupled to each of active points of the electronic circuits, and the conductive member is a bundle of a plurality of grounding wires, each of which is coupled to each of grounding points selected within the operation panel.

(6) The operation panel of item 5, wherein the grounding points are selected as being effective for preventing the operation panel from occurring an error in data inputting and/or information-displaying operations, caused by a noise induced or generated in the operation panel.

(7) The operation panel of item 1, wherein the conductive member is a plate member having electrical conductivity, mechanical flexibility and elasticity.

(8) The operation panel of item 1, wherein the conductive member is a resin material having electrical conductivity, mechanical compressibility and elasticity.

(9) An image-forming apparatus, comprising: an image-forming section: and an operation panel, which is detachably or movably mounted onto the image-forming apparatus, and which includes a data-inputting section to input operational data necessary for operating the image-forming apparatus and/or a displaying section to display status information of the image-forming apparatus; wherein the operation panel comprises: a circuit board, on which electronic parts, constituting electronic circuits for driving the data-inputting section and/or the displaying section, are mounted; a supporting member to support the circuit board, the data-inputting section and/or the displaying section, so as to integrate them into a single unit serving as the operation panel; a signal line, connected to a connecting port of the image-forming section, through which electronic signals are communicated between the operation panel and the image-forming section; and a conductive member for directly grounding at least one of the data-inputting section, the displaying section and the circuit board to a conductive main-frame of the image-forming apparatus, which is maintained at a ground-potential of the image-forming apparatus; and wherein the signal line and the conductive member are disposed at separate positions being different relative to each other.

(10) The image-forming apparatus of item 9, wherein the supporting member comprises an opening section through which the conductive member is led out of the operation panel.

(11) The image-forming apparatus of item 9, wherein the data-inputting section includes at least one of a touch panel, a hard-keys board and a ten-keys board, and/or the displaying section includes at least one of a liquid-crystal display unit, a fluorescent display-tube and a light emitting diode.

(12) The image-forming apparatus of item 9, wherein the operation panel further comprises: a shielding member to electrically shield either a part of or all of the operation panel; and wherein the conductive member is electrically coupled to the shielding member.

(13) The image-forming apparatus of item 9, wherein the signal line is a bundle of a plurality of signal wires, each of which is coupled to each of active points of the electronic circuits, and the conductive member is a bundle of a plurality of grounding wires, each of which is coupled to each of grounding points selected within the operation panel.

(14) The image-forming apparatus of item 13, wherein the grounding points are selected as being effective for preventing the operation panel from occurring an error in data inputting and/or information-displaying operations, caused by a noise induced or generated in operation panel.

(15) The image-forming apparatus of item 9, wherein the conductive member is a plate member having electrical conductivity, mechanical flexibility and elasticity.

(16) The image-forming apparatus of item 9, wherein the conductive member is a resin material having electrical conductivity, mechanical compressibility and elasticity.

Further, to overcome the abovementioned problems, other image-recording apparatus, embodied in the present invention, will be described as follow:

(17) An operation panel used for an image-forming apparatus, characterized by comprising:
an operation panel main-body, in which at least a liquid-crystal display section is movable relative to a main-body of the image-forming apparatus;
a signal line, through which the operation panel main-body is coupled to the main-body of the image-forming apparatus; and
a conductive member for grounding, equipped separately from the signal line, through which electronic parts of the operation panel main-body are electrically connected to a conductive mainframe of the image-forming apparatus.

(18) The operation panel, cited in item 17, characterized in that the conductive member is composed of a wire material.

(19) The operation panel, cited in item 17, characterized in that the conductive member is a plate member having electrical conductivity, mechanical flexibility and elasticity.

(20) The operation panel, cited in item 17, characterized in that the conductive member is made of a resin material having electrical conductivity, mechanical compressibility and elasticity.

(21) An operation panel used for an image-forming apparatus, characterized by comprising:
an operation panel main-body, in which at least a liquid-crystal display section is movable relative to a main-body of the image-forming apparatus;
a signal line, through which the operation panel main-body is coupled to the main-body of the image-forming apparatus;
a conductive member, electrically connected to a conductive mainframe of the image-forming apparatus; and
a shielding member, through which electronic parts of the operation panel main-body are electrically connected to the conductive member.

(22) An operation panel used for an image-forming apparatus, characterized by comprising:
an operation panel main-body, in which at least a liquid-crystal display section is movable relative to a main-body of the image-forming apparatus;
a signal line, through which the operation panel main-body is coupled to the main-body of the image-forming apparatus;
a conductive supporting member, through which electronic parts of the operation panel main-body are electrically connected to a conductive mainframe of the image-forming apparatus, while movably supporting the operation panel main-body onto the main-body of the image-forming apparatus.

(23) The operation panel, cited in item 22, characterized by further comprising:
a conductive member, through which electronic parts of the operation panel main-body are electrically connected to a conductive mainframe of the image-forming apparatus.

(24) The operation panel, cited in item 21 or 23, characterized in that the conductive member is composed of a wire material.

(25) The operation panel, cited in item 21 or 23, characterized in that the conductive member is a plate member having electrical conductivity, mechanical flexibility and elasticity.

(26) The operation panel, cited in item 21 or 23, characterized in that the conductive member is made of a resin material having electrical conductivity, mechanical compressibility and elasticity.

(27) An image-forming apparatus, characterized by comprising:

a main-body of the image-forming apparatus; and the operation panel, cited in anyone of items 17–26.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
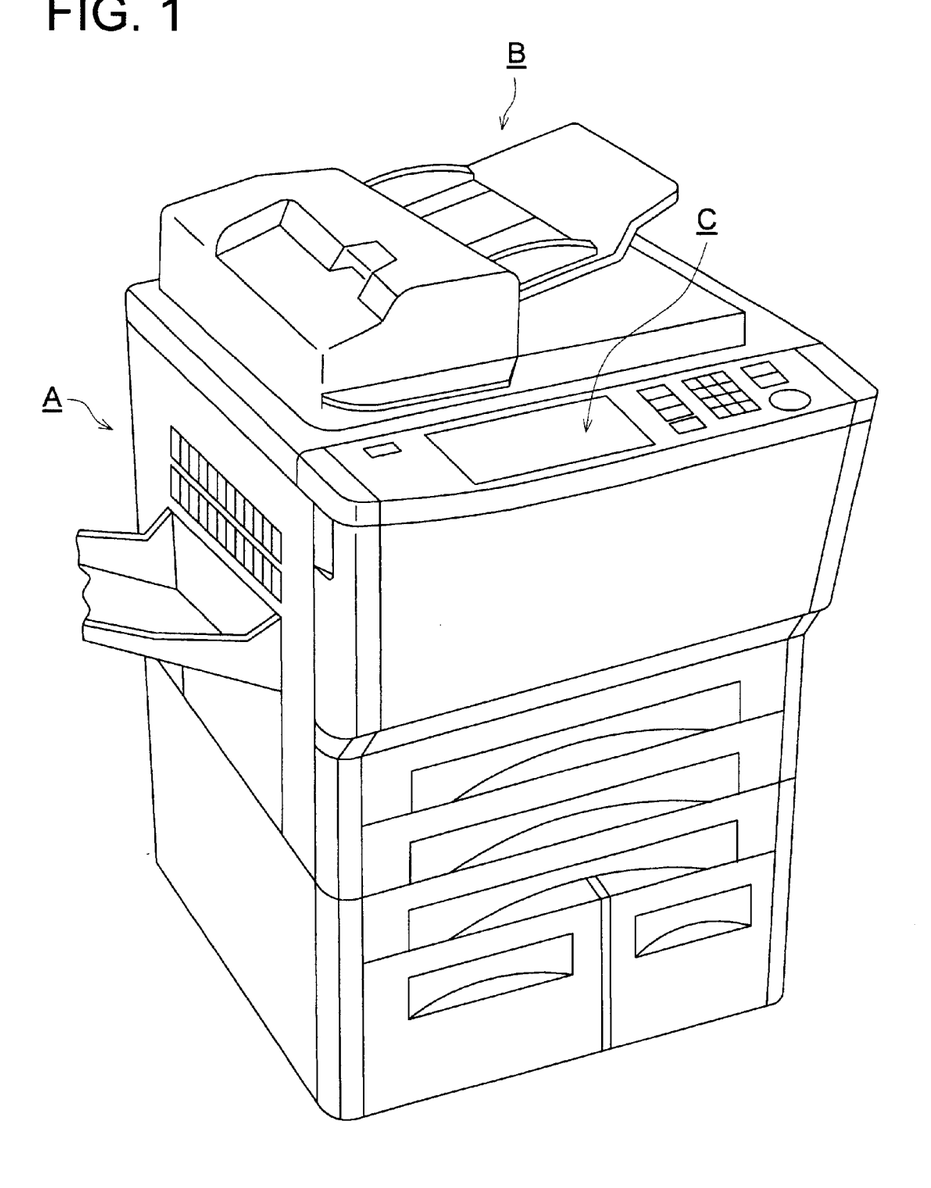
FIG. 1 shows a perspective view of an image-forming apparatus embodied in the present invention.

FIG. 1 shows a perspective view of the image-forming apparatus embodied in the present invention. Although the image-forming apparatus shown in FIG. 1 employs the electro-photographic method for forming an image onto a recording medium, the present invention is not limited to the image-forming apparatus shown in FIG. 1, but can be also applied to the image-forming apparatus, which employs the ink-jetting method or a thermal-sensitive method.

The image-forming apparatus comprises main-section A for forming an image on a recording medium, document conveyance section B, for reading a document to be processed by main-section A, and operation panel C, which includes operation panel main-body CH, signal wires for electrically coupling operation panel C to main-section A and conductive members for grounding electric parts mounted in operation panel main-body CH.

Figure 2A:
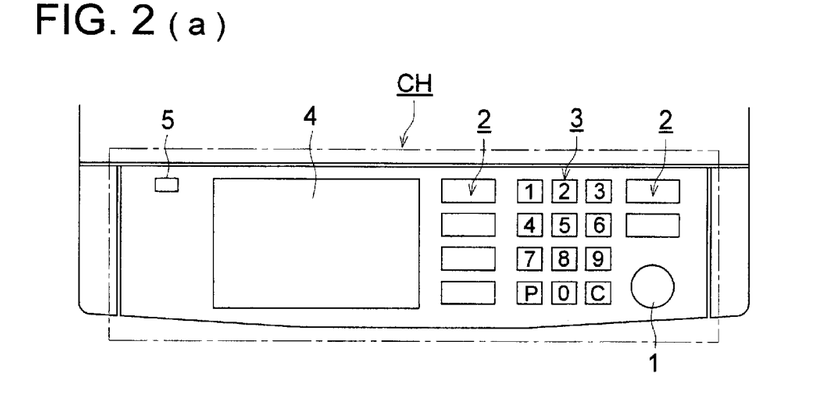
FIG. 2(a), FIG. 2(b) and FIG. 2(c) show examples of an operation panel embodied in the present invention.
Figure 2B:
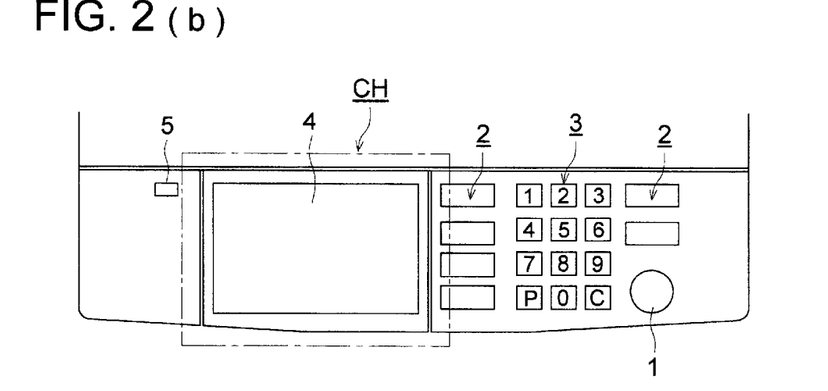

As shown in FIG. 2(a) and FIG. 2(b), operation panel main-body CH is equipped with copy start button 1, function button 2 used for setting an image-forming mode or an image-forming application, ten key 3, touch panel 4 serving as a liquid-crystal display section and main switch 5.

Figure 2C:
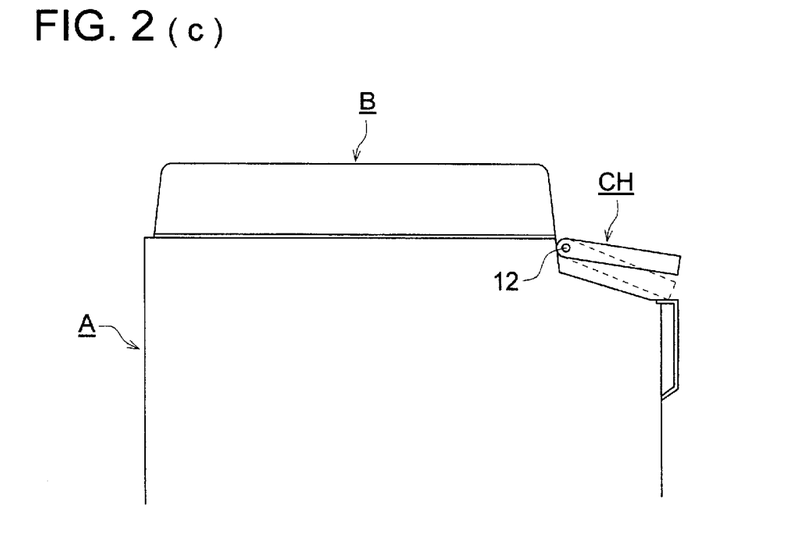

As shown in FIG. 2(c), operation panel main-body CH is rotatably supported by axis 12 fixed to main-section A, so that the poison of operation panel main-body CH can be set at an arbitral position between the positions indicated by the solid line and the broken line.

In the example shown in FIG. 2(a), all of operation panel main-body CH within an area enclosed by one-dot chain lines is rotatably supported by axis 12 fixed to main-section A. While, in the example shown in FIG. 2(b), although the hard keys, such as copy start button 1, function button 2, ten key 3, main switch 5, etc., are directly fixed on main-section A, only the touch panel 4 within an area enclosed by one-dot chain lines is rotatably supported by axis 12 fixed to main-section A.

FIG. 3(a), FIG. 3(b), FIG. 3(c), FIG. 4(a), and FIG. 4(b) show modified examples of grounding the electric parts in operation panel main-body CH. In the first example shown in FIG. 3(a), separating from the signal wires, conductive wires serving as conductive members for grounding are employed. Namely, signal-wires bundle 10, through which operation panel main-body CH is coupled to main-section A, and grounding-wires bundle 11, which is formed separately from signal-wires bundle 10, are provided. Electronic signals, including controlling signals, etc., are communicated between operation panel main-body CH and main-section A through signal-wires bundle 10, and the electric parts mounted in operation panel main-body CH are grounded through the wire materials included in grounding-wires bundle 11. Numerals 10a, - - - , 10n indicate connectors for connecting them to the electronic parts mounted on the circuit board in operation panel main-body CH, while numeral 11a indicates a grounding connector for connecting the grounding points set on the circuit board directly to the conductive frame (not shown in the drawings) of main-body CH.

Figure 3A:
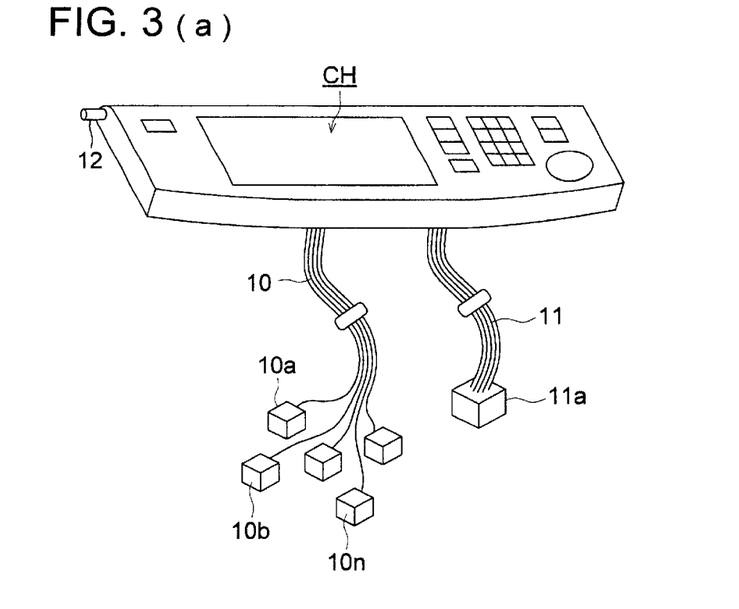
FIG. 3(a), FIG. 3(b), FIG. 3(c), and FIG. 3(d) show modified examples of grounding electric parts in an operation panel main-body.

Operation panel main-body CH is equipped with the circuit board on which copy start button 1, function button 2, ten key 3, etc. are mounted, the liquid-crystal unit, the LCD driving circuit board, the control circuit board, etc. Various kinds of electronic parts, such as CPU and other IC chips, resisters, capacitors, etc., are mounted on the above-mentioned circuit boards, and operation panel main-body CH is totally grounded to main-section A by grounding every individual electronic part and/or every unit circuit through the wire materials included in grounding-wires bundle 11.

As shown in FIG. 3(a), since signal-wires bundle 10 and grounding-wires bundle 11 are formed and equipped separately each other, it becomes possible to effectively prevent operation panel main-body CH from occurring an erroneous operation, even if noises, such as a high-voltage pulse noise, etc., happen to generated.

Figures 3B, 3C, 3D:
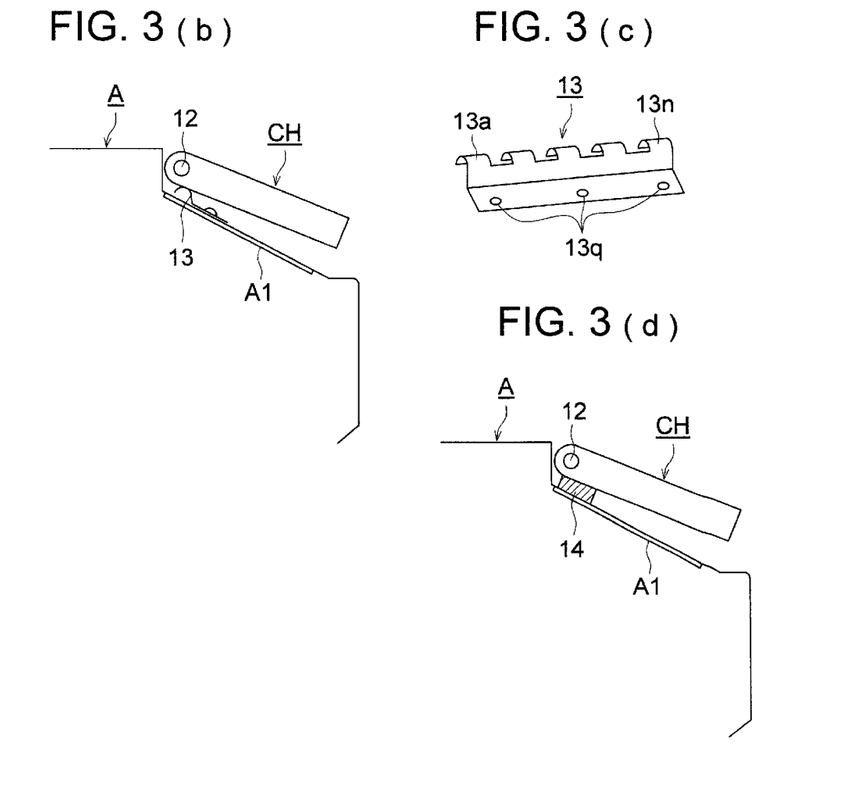

FIG. 3(b) shows the second example for grounding the electronic parts included in operation panel main-body CH to main-section A.

In the second example, metal plate 13, serving as a plate member having conductivity, flexibility and elasticity, is employed. As shown in FIG. 3(c), metal plate 13 has contact points 13a, - - - , 13n, which contact the grounding electrodes of operation panel main-body CH, and holes 13q through which the screws are fastened into conductive frame A1 of main-section A. In this structure, the electronic parts, mounted on operation panel main-body CH, are electrically grounded to conductive frame A1 of main-section A through metal plate 13.

FIG. 3(d) shows the third example for grounding the electronic parts included in operation panel main-body CH to main-section A.

In the third example, resin material 14 made of a foaming resin material, such as a conductive rubber or a conductive sponge having conductivity, flexibility and elasticity, is employed. As well as the second example shown in FIG. 3(b), the electronic parts, mounted on operation panel main-body CH, are electrically grounded to conductive frame A1 of main-section A through resin material 14.

Figure 4A:
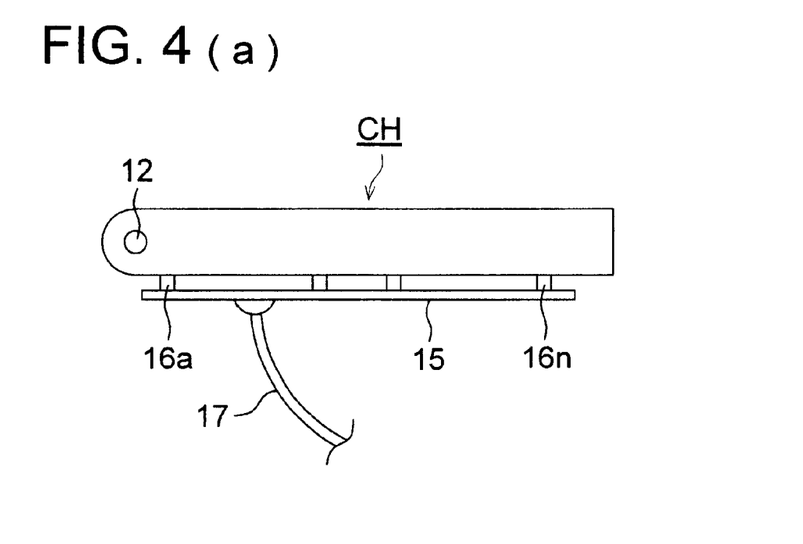
FIG. 4(a) and FIG. 4(b) show other modified examples of grounding electric parts in an operation panel main-body.

FIG. 4(a) shows the fourth example for grounding the electronic parts included in operation panel main-body CH to main-section A.

In the fourth example, conductive plate 15, made of a metal plate or a metal foil and serving as an electro-magnetic shielding member, is employed. Each of protrusions 16a, - - - , 16n, formed as grounding electrodes for grounding the electronic parts mounted on operation panel main-body CH, contacts conductive plate 15, which is further grounded to the conductive frame (not shown in the drawings) of the main-section A of the image-forming apparatus with wire material 17 serving as a conductive material for grounding.

According to the fourth example, since conductive plate 15 works as the electro-magnetic shielding member, the influence of the noises can be effectively shielded. Further, in the fourth example, it is also applicable that either the plate material shown in FIG. 3(b) or the resin material shown in FIG. 3(d) is employed as the conductive material for grounding conductive plate 15 to the conductive frame of the main-section A.

Figure 4B:
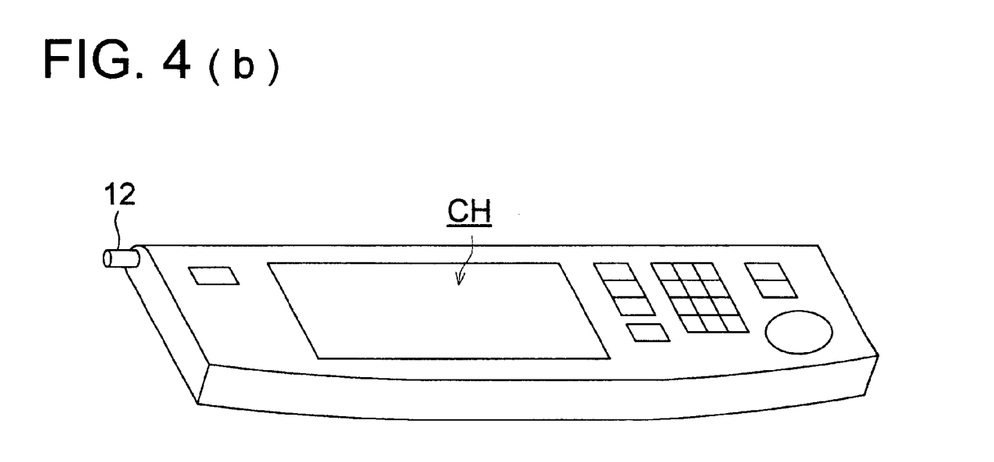

FIG. 4(b) shows the fifth example for grounding the electronic parts included in operation panel main-body CH to main-section A.

According to the fifth example, since axis 12, serving as a conductive supporting member for rotatably attaching operation panel main-body CH onto main-section A of the image-forming apparatus, is made of a conductive material, such as metal, etc., and is connected to electronic parts of the operation panel, and further connected to the conductive mainframe of the image-forming apparatus, it becomes possible to ground operation panel main-body CH in a good condition. As for the fifth example, it is applicable that axis 12 itself is directly connected to the conductive mainframe of the image-forming apparatus, or it is also applicable that axis 12 is indirectly connected to the conductive mainframe of the image-forming apparatus by putting the wire material, the plate member or the resin material, shown in FIG. 3(a)–FIG. 3(d), between them.

According to the present invention, the following effects can be attained.

(1) Since the inclination angle of the operation panel can be adjusted at various angles, it becomes possible to maintain the visibility of the touch panel including the liquid-crystal display always in a good condition, resulting in an improvement of maneuverability of the image-forming apparatus. In addition, the erroneous operations, caused by the fact that the electronic parts in the operation panel are influenced by noises, including a high-voltage noise, etc., generated in the main-section of the image-forming apparatus, can be effectively prevented.

(2) Since the grounding circuit is formed only by putting the operation panel on the conductive member for grounding, it becomes possible to firmly ground the electronic parts of the operation panel with a simple structure.

(3) Since the electronic parts of the operation panel are electrically shielded from the main-body of the image-forming apparatus, it becomes possible to provide the image-forming apparatus having the operation panel, which is strongly protected against noises.

(4) Since the conductive supporting member for supporting the operation panel also works as the conductive member for grounding, it becomes possible to simplify the structure of grounding without increasing the manufacturing cost of the image-forming apparatus, resulting in an effective grounding of the operation panel.

Disclosed embodiments can be varied by a skilled person without departing from the spirit and scope of the invention.

What is claimed is:

1. An operation panel, which is detachably or movably mounted onto an image-forming apparatus, and which includes a data-inputting section to input operational data necessary for operating said image-forming apparatus and/or a displaying section to display status information of said image-forming apparatus, said operation panel comprising:

a circuit board, on which electronic parts, constituting electronic circuits for driving said data-inputting section and/or said displaying section, are mounted;

a supporting member to support said circuit board, said data-inputting section and/or said displaying section, so as to integrate them into a single unit serving as said operation panel;

a signal line, connected to a connecting port of an image-forming section incorporated in said image-forming apparatus, through which electronic signals are communicated between said operation panel and said image-forming section; and a conductive member for directly grounding at least one of said data-inputting section, said displaying section and said circuit board to a conductive main-frame of said image-forming apparatus, which is maintained at a ground-potential of said image-forming apparatus;

wherein said signal line and said conductive member are disposed at separate positions being different relative to each other.

2. The operation panel of claim 1, wherein said supporting member comprises an opening section through which said conductive member is led out of said operation panel.

3. The operation panel of claim 1, wherein said data-inputting section includes at least one of a touch panel, a hard-keys board and a ten-keys board, and/or said displaying section includes at least one of a liquid-crystal display unit, a fluorescent display-tube and a light emitting diode.

4. The operation panel of claim 1, further comprising:

a shielding member to electrically shield either a part of or all of said operation panel;

wherein said conductive member is electrically coupled to said shielding member.

5. The operation panel of claim 1, wherein said signal line is a bundle of a plurality of signal wires, each of which is coupled to each of active points of said electronic circuits, and said conductive member is a bundle of a plurality of grounding wires, each of which is coupled to each of grounding points selected within said operation panel.

6. The operation panel of claim 5, wherein said grounding points are selected as being effective for preventing said operation panel from occurring an error in data inputting and/or information-displaying operations, caused by a noise induced or generated in said operation panel.

7. The operation panel of claim 1, wherein said conductive member is a plate member having electrical conductivity, mechanical flexibility and elasticity.

8. The operation panel of claim 1, wherein said conductive member is a resin material having electrical conductivity, mechanical compressibility and elasticity.

9. An image-forming apparatus, comprising:

an image-forming section: and an operation panel, which is detachably or movably mounted onto said image-forming apparatus, and which includes a data-inputting section to input operational data necessary for operating said image-forming apparatus and/or a displaying section to display status information of said image-forming apparatus;

wherein said operation panel comprises:

a circuit board, on which electronic parts, constituting electronic circuits for driving said data-inputting section and/or said displaying section, are mounted;

a supporting member to support said circuit board, said data-inputting section and/or said displaying section, so as to integrate them into a single unit serving as said operation panel;

a signal line, connected to a connecting port of said image-forming section, through which electronic signals are communicated between said operation panel and said image-forming section; and a conductive member for directly grounding at least one of said data-inputting section, said displaying section and said circuit board to a conductive mainframe of said image-forming apparatus, which is maintained at a ground-potential of said image-forming apparatus; and wherein said signal line and said conductive member are disposed at separate positions being different relative to each other.

10. The image-forming apparatus of claim 9, wherein said supporting member comprises an opening section through which said conductive member is led out of said operation panel.

11. The image-forming apparatus of claim 9, wherein said data-inputting section includes at least one of a touch panel, a hard-keys board and a ten-keys board, and/or said displaying section includes at least one of a liquid-crystal display unit, a fluorescent display-tube and a light emitting diode.

12. The image-forming apparatus of claim 9, wherein said operation panel further comprises:
a shielding member to electrically shield either a part of or all of said operation panel; and wherein said conductive member is electrically coupled to said shielding member.

13. The image-forming apparatus of claim 9, wherein said signal line is a bundle of a plurality of signal wires, each of which is coupled to each of active points of said electronic circuits, and said conductive member is a bundle of a plurality of grounding wires, each of which is coupled to each of grounding points selected within said operation panel.

14. The image-forming apparatus of claim 13, wherein said grounding points are selected as being effective for preventing said operation panel from occurring an error in data inputting and/or information-displaying operations, caused by a noise induced or generated in operation panel.

15. The image-forming apparatus of claim 9, wherein said conductive member is a plate member having electrical conductivity, mechanical flexibility and elasticity.

16. The image-forming apparatus of claim 9, wherein said conductive member is a resin material having electrical conductivity, mechanical compressibility and elasticity.

* * * * *

UNITED STATES PATENT AND TRADEMARK OFFICE
CERTIFICATE OF CORRECTION

PATENT NO. : 6,725,001 B2
DATED : April 20, 2004
INVENTOR(S) : Takahashi et al.

It is certified that error appears in the above-identified patent and that said Letters Patent is hereby corrected as shown below:

<u>Title page,</u>
Item [73], Assignee, change to read -- Konica Corporation, Toyko, Japan. --

Signed and Sealed this

Second Day of August, 2005

JON W. DUDAS
*Director of the United States Patent and Trademark Office*